United States Patent [19]

Landau et al.

[11] Patent Number: 4,963,518

[45] Date of Patent: Oct. 16, 1990

[54] SILANATED METAL-PILLARED INTERLAYERED CLAY

[75] Inventors: Steven D. Landau, Union Township; James A. Hinnenkamp, St. Bernard, both of Ohio

[73] Assignee: Quantum Chemical Corporation, New York, N.Y.

[21] Appl. No.: 379,129

[22] Filed: Jul. 13, 1989

[51] Int. Cl.$^5$ ............................................... B01J 21/16
[52] U.S. Cl. .......................................... 502/62; 502/84
[58] Field of Search ............................. 502/62, 63, 84

[56] References Cited

U.S. PATENT DOCUMENTS

| | | | |
|---|---|---|---|
| 3,725,302 | 4/1973 | Shimely et al. | 502/62 |
| 4,176,090 | 11/1979 | Vaughn et al. | 252/455 Z |
| 4,216,188 | 8/1980 | Shabrai et al. | 423/118 |
| 4,510,257 | 4/1985 | Lewis et al. | 502/63 |
| 4,701,430 | 10/1987 | Jung et al. | 502/62 |
| 4,774,212 | 9/1988 | Drezdon | 502/62 |
| 4,916,095 | 4/1990 | Fogler et al. | 502/62 |

FOREIGN PATENT DOCUMENTS

| | | | |
|---|---|---|---|
| 49936 | 4/1982 | European Pat. Off. | 502/62 |
| 92858 | 11/1983 | European Pat. Off. | 502/84 |
| 58565 | 10/1979 | Israel . | |

*Primary Examiner*—Carl F. Dees
*Attorney, Agent, or Firm*—Kenneth D. Tremain; Richard G. Jackson

[57] ABSTRACT

The instant disclosure is directed to a silanated metal-pillared interlayered clay which comprises the reaction product of a metal-pillared interlayered clay and a silanating agent. The clay finds application as a catalyst in the isomerization of olefins and in the conversion of syngas intermediates into hydrocarbon streams rich in $C_3$ and $C_4$ hydrocarbons.

12 Claims, No Drawings

SILANATED METAL-PILLARED INTERLAYERED CLAY

BACKGROUND OF THE DISCLOSURE

1. Field of the Invention

The present invention is directed to a class of silanated metal-pillared interlayered clays. More specifically, the present invention is directed to a class of silanated metal-pillared interlayered clays characterized by decreased surface area, pore volume and cyclohexane adsorption compared to unsilanated pillared interlayered clays.

2. Background of the Prior Art

Pillared interlayered clays are formed from naturally occurring and synthetic layered smectites such as laponite, bentonite, montmorillonite and chlorite. These silicates may be visualized as "sandwiches" composed of silicate sheets containing four layers of oxygen atoms. These "sandwiches" or platelets are stacked one upon the other to yield a clay particle. Normally this arrangement yields a repeating structure every nine or so Angstroms.

A considerable amount of research has resulted in the determination that these platelets can be further separated by as much as 30 to 40 Angstroms. This further separation is effected by an interlayering procedure. The procedure involves intercalation of various polar molecules such as water, ethylene glycol and amines. Interlayered clays prepared from naturally occurring smectites however are not suitable for general adsorbent and catalytic applications because they tend to collapse when subjected to elevated temperature.

To overcome these difficencies smectites have been synthesized into pillared interlayered clays by exchanging the cation in the natural silicate with a replacement cation. This is accomplished by swelling the smectite in a suitable suspending agent, usually water, and adding the desired replacement cation to the suspension. Although aluminum cations are most commonly employed, pillared interlayered clays may be formed from other cations. Other cations which may be employed include chromium, nickel, iron, zirconium, molybdenum, niobium and silicon. It is emphasized that this group is not exhaustive and other metal cations may also be employed.

This procedure results in the formation of a metal-pillared interlayered clay where the metal is defined by the identity of the cation. This is so because the cation introduced between clay, platelets is of larger size than the cation naturally presert in the smectite. Moreover, if the cation introduced into the smectite, to form the pillared interlayered clay, is catalytically active the so-formed metal-pillared interlayered clay can be utilized as a catalyst.

Metal-pillared interlayered clays formed in accordance with the description given above are known to be useful as adsorbents, filtration media and the like. Although there are some disclosures in the prior art directed to the use of metal-pillared interlayered clays as catalysts, this utility has been sparsely developed in the literature.

One recent publication in this area is the use of pillared interlayered clays as cracking catalysts U.S. Pat. No. 4,510,257 to Lewis et al. describes the use of a pillared clay composition which acts as a catalyst in the cracking of hydrotreated light cat cracker feed and the isomerization of hexane.

Another metal-pillared interlayered clay product that has found application as a catalyst is the montmorillonite-based hydrogenation catalyst disclosed in Israeli Pat. application No. 58,565, filed Oct. 25, 1979 and published Nov. 30, 1982. That application discloses a pillared type clay having catalytic activity in hydrogenation applications wherein a montmorillonite clay is crosslinked by a hydroxymetal polymer, preferably, a hydroxynickel polymer.

The need in the art for the development of new processes to synthesize hydrocarbon streams rich in $C_3$-$C_4$ hydrocarbons is well established Such hydrocarbon feeds are, of course, critical in the production of polypropylene resins. In a like vein, these hydrocarbons are utilized in the polymerization of ethylene copolymers, important in the plastics and synthetic rubber industries. Both $C_3$ and $C_4$ hydrocarbon feed streams also find important use as starting materials in the oligomerization to higher hydrocarbons for a myriad of uses. Thus, it is not surprising that there is a continuing demand for new and better processes to form these products.

A suggested route to provide a source of hydrocarbons is the exploitation of the well known syngas process. That is, it has been proposed that intermediates formed from methanol, which, in turn, is the product of a catalytic syngas process could serve as a readily available feedstream to produce $C_3$-$C_4$ hydrocarbons. Specifically, dimethyl ether is a downstream product of methanol formed in the syngas process. Thus, it has been proposed that a route to $C_3$-$C_4$ hydrocarbons could come from the catalytic conversion of dimethyl ether in that it is known that the dehydration of ethers and alcohols over acidic catalysts produces hydrocarbons.

Turning again to pillared clays, it has been proposed that such materials could serve as catalysts in this application. When a metal-pillared clay catalyst is utilized in this application, it is found that a hydrocarbon product stream is produced. Although this stream is rich in $C_2$ to $C_4$ hydrocarbons, the concentration of $C_2$ hydrocarbons (ethane and ethylene) is significant, requiring further separation to produce the desired $C_3$-$C_4$ hydrocarbon stream product.

BRIEF SUMMARY OF THE INVENTION

A new pillared interlayered clay product has now been found which possesses novel catalytic properties useful in the catalytic conversion of oxygenated compounds, formed as intermediates in the syngas process, to form hydrocarbon streams rich in $C_3$ and $C_4$ hydrocarbons.

In accordance with the instant invention a new metal-pillared interlayered clay is provided The clay comprises the reaction product of a metal-pillared interlayered clay and a silanating agent.

DETAILED DESCRIPTION

The formation of pillared interlayered clays, obtained by reacting smectite type clays with polymeric cationic hydroxymetal complexes, is known in the art. A multiplicity of references teach such clays. For example, U.S. Pat. No. 4,176,090 to Vaughan et al. and U.S. Pat. No. 4,216,188 to Shabrai et al., the disclosures of which are incorporated herein by reference, illustrate methods of producing pillared interlayered clays as well as the clays themselves. Suffice it to say, the metal-pillared interlayered clays of the present invention are generally categorized as the reaction product of smectite type clays and polymeric cationic hydroxymetal complexes. This reaction has the effect of forming pillars of from about 4 Angstroms to about 20 Angstroms, preferably, from about 6 Angstroms to about 12 Angstroms, in length.

The preferred smectite clays utilized in the formation of the metal-pillared interlayered clay product of the present invention is montmorillonite or hectorite. The preferred cationic agent, employed to replace the natural cation of the smectite, is selected from the group consisting of aluminum, zirconium, titanium, chromium, nickel or iron. Preferably, the cationic replacement is aluminum, zirconium, chromium or nickel. More preferably, the cation is aluminum, zirconium or chromium. Still more preferably, the cation is aluminum or zirconium. Most preferably, the cation used in the formation of the metal-pillared interlayered clay of the present invention is aluminum.

The metal-pillared interlayered clay discussed above is reacted with a silanating agent to produce the metal-pillared interlayered clay product of this invention. The silanating agent is generally any silicon-containing organic compound. Among the silicon-containing organic compounds preferred for use as silanating agents in the present invention are silicon-containing organic compounds containing methyl and chlorine groups such as methyltrichlorosilane, dimethyldichlorosilane and trimethylchlorosilane and polyhedral oligosilsesquioxanes such as the hydrolyzed product of 2-(2-trichlorosilylethyl)pyridine. This group of illustrative silicon-containing organic compounds is very brief and far from exhaustive. Other silanes, that is, other silicon-containing organic compounds, not mentioned herein are within the contemplation of the present invention. However, the above-mentioned silanating agents are preferred. Of these, dimethyldichlorosilane and the hydrolyzed product of 2-(2-trichlorosilylethyl)pyridine are more preferred. It is particularly preferred that the silanating agent be dimethyldichlorosilane.

The following examples are given to illustrate the scope of the present invention. Because these examples are given for illustrative purposes only, they should not be interpreted as limiting the invention thereto.

EXAMPLE 1

Formation of Silanated Aluminum-Pillared Interlayered Clay

Five grams of an aluminum-pillared interlayered clay characterized by a Q of 4.6, that is, a clay having a concentration of 4.6 millimoles of aluminum per milliequivalent of clay in the pillaring reaction, an adsorption capacity, as determined by the use of 3-methylpentane, of 21.4 cc/g and a surface area of 330 $m^2/g$, as measured by ASTM D 3663-78, was suspended in 40 ml. of toluene. A solution of 2 ml. of dimethyldichlorosilane was added to the suspension. The resulting suspension was mixed for 10 minutes. Fifty ml. of methanol was then added to the suspension. The suspension was then filtered to separate the solid aluminum-pillared clay from the liquid solution in which it was suspended The catalyst was next sequentially washed with methanol and acetone The washed clay was, lastly, air dried.

The silanated aluminum-pillared interlayered clay, treated in accordance with the above procedure, was characterized by an adsorption capacity, as determined by the use of 3-methylpentane of 19.1 cc/g, a decrease of about 12% from the presilanated state, and a surface area, as measured by nitrogen BET, in accordance with ASTM D3663-78, of 234 $m^2/g$, a decrease of 31% from that possessed by the pre-silanated aluminum-pillared interlayered clay.

EXAMPLE 2

Catalytic Conversion of Dimethyl Ether to Hydrocarbons

The silanated aluminum-pillared interlayered clay formed in accordance with the procedure of Example 1 was employed in the catalatic conversion of dimethyl ether to produce a hydrocarbon product. In this example, a continuous stream of dimethyl ether (DME) was contacted with the silanated aluminum-pillared interlayered clay of Example 1 at a temperature of 300° C. and a pressure of 6 psig in a quartz reactor. The DME was introduced into the reactor, in which the silanated clay was disposed, at a weight hourly space velocity of 2 $hr^{-1}$. The rate of introduction of the DME was controlled by a mass flow controller through which the DME was fed into the reactor.

The effluent of this reaction was collected in a wet ice trap upstream of a dry ice trap with which it was in series. Non-condensibles were measured with a wet test meter. The hydrocarbon layer was analyzed using a 6 ft. column of 20% TCEP on Chromosorb [trademark]operated isothermally at 105° C. The aqueous layer was analyzed by a 7 ft. 100/120 mesh Chromosorb [trademark]101 column operated at a temperature in the range of between 100° C. and 140° C., at a 10° C. per minute ramp rate. That is, the temperature of the column, which was initially set at 100° C., was increased to 140° C. over a period of 4 minutes. The non-condensibles were determined by use of a Carle [Trademark] 531 gas chromatograph.

The above means of analysis resulted in the determination that the product was a hydrocarbon stream representing a 29% conversion of the DME, based on the carbon content of the DME reactant The selectivity to $C_2$ to $C_4$ hydrocarbons was 70%. However, of this 70% only 1% were the $C_2$ hydrocarbons, ethane and ethylene.

COMPARATIVE EXAMPLE 1 (CE 1)

Catalytic Conversion of Dimethyl Ether to Hydrocarbons

Example 2 was repeated but for the substitution of the silanated aluminum-pillared interlayered clay of that example with its aluminum-pillared interlayered clay precursor, that is, the same interlayered clay produced prior to silanation.

The product of the catalytic reaction of DME was again a hydrocarbon stream. The $C_2$ to $C_4$ hydrocarbon constituency of this stream represented a hydrocarbon yield of 36%, based on the carbon content of the DME. The $C_2$ to $C_4$ hydrocarbon selectivity, also based on DME carbon content, was 79%. Of this, 16% of the hydrocarbon stream was ethane and ethylene.

EXAMPLE 3

Preparation of Silanated Aluminum-Pillared Interlayered Clay

Using a Polyhedral Oligosilsesquioxane Silanating Agent

Ten grams of an aluminum-pillared interlayered clay having a Q of 10 was mixed with a polyhedral oligosilsesquioxane solution. The solution, with which the clay was mixed, was the product resulting from slowly adding 47.3 ml of methanol to 6.45 g of 2-(2-trichlorosilylethyl)pyridine in an ice bath to insure that the temperature of this addition was 0° C. Upon complete addition, 2.8 g. of deionized water was added to the solution The solution was subsequently stirred for 2 hours.

The mixture containing the clay and the solution was made less acidic to the dropwise addition of concentrated ammonium hydroxide. This resulted in an increase of the solution pH from an initial pH of 2 to a final pH of 6. When the solution attained a pH of 6 it was stirred for 2 hours. The silanated clay was then washed over a fritted funnel with deionized water until the pH of the wash solution did not change. At that point the clay was air dried. The thus dried clay was subsequently heated at 350° C. for 2 hours in an inert atmosphere.

EXAMPLE 4 AND COMPARATIVE EXAMPLE 2

Isomerization of 3,3-Dimethyl-1-Butene

The silanated clays of Examples 1 and 3 were utilized as catalysts in the isomerization of 3,3-dimethyl-1butene (3,3-DMB) to 2,3-dimethyl-1-butene (2,3-DMB). This isomerization reaction, conducted at a temperature of 300° C and atmospheric pressure, occurred in a reactor charged with 50 mg of the silanated clays of Examples 1 and 3.

For comparative purposes, the reactor was separately charged with 50 mg of the same precursor aluminum-pillared interlayered clay utilized in the formation of the silanated clays of Examples 1 and 3. That is, in the comparative example, denoted Comparative Example 2, a non-silanated pillared interlayered clay was employed as the isomerization catalyst.

In this reaction the 50 mg. of the silanated or unsilanated clay was packed in the glass liner of a Varian [trademark]3700 gas chromatograph. The 3, 3-DMB was passed through the packed chromatograph in 0.12 microliter pulses. That is, nitrogen vector gas was continuously swept through a bubbler which contained the 3, 3-DMB and then through a Valco [trademark] injector valve. Upon actuation of the injector valve a pulse of 3, 3-(:MB was introduced into the chromatograph.

The products were analyzed in an analysis column which consisted of 9% glutaronitrile, 21% propylene carbonate and 70% 100/120 mesh firebrick, all said percentages being by weight. The column was isothermally operated and resolved hydrocarbons of one to six carbon atoms. Unresolved higher molecular weight effluent was designated as oligomers.

The results of these examples are summarized in the Table.

TABLE

| Clay of Example No. | Silanating Agent | Pulse No. | Conversion, % | Selectivity, % | | |
|---|---|---|---|---|---|---|
| | | | | 2,3-DMB | Cracked | Coke |
| 1 | DMDCS | 1 | 78 | 4 | 42 | 51 |
| | | 2 | 74 | 7 | 43 | 47 |
| 3 | Silanated-polyhedral | 1 | 76 | 37 | 20 | 43 |
| | | 2 | 78 | 49 | 18 | 33 |
| CE1 | None | 1 | 81 | 0 | 44 | 56 |
| | | 2 | 73 | 0 | 43 | 57 |

Notes: DMDCS is dimethyldichlorosilane
Silanated polyhedral is the hydrolyzed product of 2-(2-trichloro-silylethyl)pyridine.
2,3-DMB is 2,3-dimethyl-1-butene.
Cracked is the 3,3-DMB fraction converted to methane.
Coke encompasses all higher molecular weight compounds produced.
In both pulses using DMDCS as silanating agent the selectivity includes 3% converted to methyl pentenes.

The above embodiments and examples are given to illustrate the scope and spirit of the present invention. These embodiments and examples will make apparent, to those skilled in the art, other embodiments and examples. These other embodiments and examples are within the contemplation of this invention. Therefore, the present invention should be limited only by the appended claims.

What is claimed is:

1. A silanated metal-pillared interlayered clay.

2. A silanated metal-pillared interlayered clay comprising the reaction product of a metal-pillared interlayered clay and a silanating agent.

3. A clay in accordance with claim 2 wherein said silanating agent is selected from the group consisting of dimethyldichlorosilane, the hydrolyzed product of (2-trichlorosilylethyl)pyridine, methyltrichlorosilane and trimethylchlorosilane.

4. A clay in accordance with claim 3 wherein said silanating agent is selected from the group consisting of the hydrolyzed product of 2-(2-trichlorosilylethyl)pyridine and dimethyldichlorosilane.

5. A clay in accordance with claim 4 wherein said silanating agent is dimethyldichlorosilane.

6. A clay in accordance with claim 2 wherein said metal of said metal-pillared interlayered clay is selected from the group consisting of aluminum, zirconium, titanium, chromium, nickel and iron.

7. A clay in accordance with claim 6 wherein said metal is selected from the group consisting of aluminum, zirconium, chromium and nickel.

8. A clay in accordance with claim 7 wherein said metal is selected from the group consisting of aluminum, zirconium and chromium.

9. A clay in accordance with claim 8 wherein said metal is aluminum or zirconium.

10. A clay in accordance with claim 9 wherein said metal is aluminum.

11. A silanated aluminum-pillared interlayered clay comprising the reaction product of an aluminum-pillared interlayered clay and a silanating agent selected from the group consisting of dimethyldichlorosilane, and the hydrolyzed product of 2-(2-trichlorosilylethyl)-pyridine.

12. A clay in accordance with claim 11 where said silanating agent is dimethyldichlorosilane.

* * * * *